United States Patent
Okamoto et al.

(10) Patent No.: US 6,846,433 B2
(45) Date of Patent: Jan. 25, 2005

(54) LIQUID CRYSTALLINE POLYESTER RESIN COMPOSITION AND MOLDED PRODUCT THEREOF

(75) Inventors: Satoshi Okamoto, Tsukuba (JP); Tohru Nagashima, Tsukuba (JP); Manabu Hirakawa, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/227,860

(22) Filed: Aug. 27, 2002

(65) Prior Publication Data

US 2003/0089887 A1 May 15, 2003

(30) Foreign Application Priority Data

Sep. 21, 2001 (JP) ........................................ 2001-288711

(51) Int. Cl.[7] .............................................. C09K 19/52
(52) U.S. Cl. .............................. 252/299.01; 252/299.6; 556/13; 524/117; 524/147; 524/151
(58) Field of Search ....................... 252/299.01, 299.6, 252/299.62, 299.63, 299.64, 299.65, 299.66, 299.67; 556/13; 524/117, 147, 151

(56) References Cited

U.S. PATENT DOCUMENTS

| | | | | |
|---|---|---|---|---|
| 5,072,014 A | * | 12/1991 | Flury | 558/86 |
| 5,221,705 A | * | 6/1993 | Inoue et al. | 524/120 |
| 6,242,514 B1 | * | 6/2001 | Kikuchi et al. | 524/117 |

FOREIGN PATENT DOCUMENTS

JP         4-318058 A       11/1992

* cited by examiner

Primary Examiner—Shean C. Wu
Assistant Examiner—Jennifer R. Sadula
(74) Attorney, Agent, or Firm—Sughrue Mion, PLLC

(57) ABSTRACT

By means of a liquid crystalline polyester resin composition containing 100 parts by weight of a liquid crystalline polyester forming an anisotropic melt phase, and not less than 0.01 part by weight and not more than 0.2 part by weight of at least one phosphite compounds defined by the formula (I):

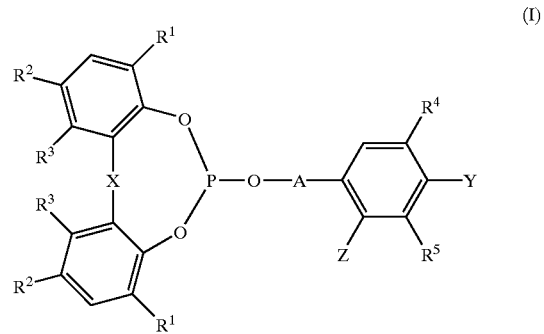

a liquid crystalline polyester resin composition capable of producing molded products having excellent thermal stability under high temperatures without causing occurrence of blister in the molded products even in the course of soldering.

14 Claims, No Drawings

LIQUID CRYSTALLINE POLYESTER RESIN COMPOSITION AND MOLDED PRODUCT THEREOF

FIELD OF THE INVENTION

The present invention relates to a liquid crystalline polyester resin composition and a molded product thereof.

BACKGROUND OF THE INVENTION

Liquid crystalline polyesters are widely used in a variety of electric and electronic fields since they are superior in mechanical properties and moldability. In association with such extension and variation of application, molding process under higher temperatures are required, and hence higher thermal stability is required.

Japanese Unexamined Patent Publication No. 4-318058 (1996) discloses a resin composition wherein 2,2'-methylenebis(4,6-di-t-butylphenyl)octyl phosphite is added to a liquid crystalline polyester as a stabilizer for improving the thermal stability. However, when this resin composition is formed into a molded product, there arose a problem that a blister occurs due to the gas generated by decomposition of the stabilizer under high temperatures in the course of soldering.

SUMMARY OF THE INVENTION

Object of the present invention is to provide a liquid crystalline polyester resin composition capable of producing a molded product having an excellent thermal stability under high temperature without causing occurrence of a blister in the molded product even in the course of soldering.

Inventors of the present invention found that a resin composition comprising a liquid crystalline polyester forming an anisotropic melt phase and 0.01 to 0.2 parts by weight of phsophite compounds defined by the formula (I) provides an excellent thermal stability under high temperatures when such a resin composition is formed into a molded product, without causing occurrence of a blister in the molded product in the course of soldering, to accomplish the present invention. Additionally, it was found that a liquid crystalline polyester resin composition containing an inorganic filler such as glass filler and a phosphite compounds defined by the formula (I) below also has an excellent thermal stability under high temperatures, whereby the present invention was accomplished.

That is, the present invention provides a liquid crystalline polyester resin composition comprising:

100 parts by weight of a liquid crystalline polyester forming an anisotropic melt phase; and from not less than 0.01 to less than 0.2 parts by weight of at least one of phosphite compounds defined by the formula (I):

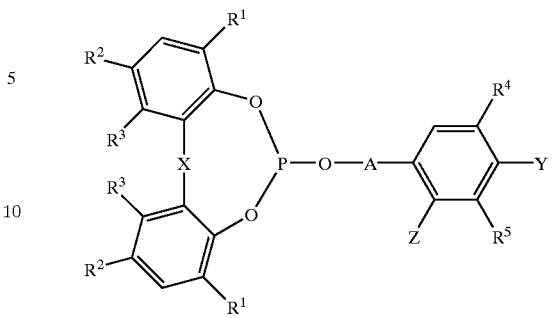

[wherein each of $R^1$, $R^2$, $R^4$ and $R^5$ represents independently a hydrogen atom, an alkyl group having 1 to 8 carbon(s), a cycloalkyl group having 5 to 8 carbons, an alkylcycloalkyl group having 6 to 12 carbons, an aralkyl group having 7 to 12 carbons or a phenyl group, $R^3$ represents a hydrogen atom or an alkyl group having 1 to 8 carbon(s), X represents a direct bond, a sulfur atom or a bivalent group defined by the formula (I-1)

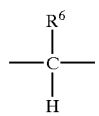

(I-1)

(wherein, $R^6$ represents a hydrogen atom, an alkyl group having 1 to 8 carbon(s) or a cycloalkyl group having 5 to 8 carbons), A represents an alkylene group having 2 to 8 carbons or a bivalent group defined by the general formula (I-2)

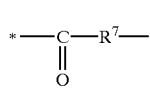

(I-2)

(wherein, $R^7$ represents a direct bond or an alkylene group having 1 to 8 carbon(s), * represents that this group is bonded with the oxygen atom on this side), either one of Y and Z represents a hydroxyl group, an alkyl group having 1 to 8 carbon(s), an alkoxyl group having 1 to 8 carbon(s) or an aralkyloxy group having 7 to 12 carbons, and the other one of Y and Z represents a hydrogen atom or an alkyl group having 1 to 8 carbon(s).]

DETAILED DESCRIPTION OF THE INVENTION

In the following, the present invention will be explained in detail.

The liquid crystalline polyester used in the present invention is a polyester called as a thermotropic liquid crystalline polymer, and examples of which include:

(1) a polymer comprising aromatic hydroxycarboxylic acids, aromatic dicarboxylic acids and an aromatic diols, (2) a polymer comprising different aromatic hydroxycarboxylic acids, (3) a polymer comprising aromatic dicarboxylic acids and aromatic diols, (4) a polymer prepared by reaction of polyesters such as polyethylene terephthalate and aromatic hydroxycarboxylic acids. Further, the liquid crystalline polyester used in the present invention form an anisotropic melt phase at a temperature of 400° C. or lower. It is noted that in place of such aromatic hydroxycarboxylic acids, aromatic dicarboxylic acids or aromatic diols, ester formable derivatives thereof may be used.

Examples of ester-formable derivative of carboxylic acid include derivatives which are highly reactive acid chlorides, acid anhydrides and the like and capable of promoting the reaction of polyester production and derivatives which are forming ester with alcohols and ethylene glycol and capable of producing polyesters by transesterification.

Further, examples of the ester formable derivative of phenolic hydroxyl group include, for example, derivatives of compounds forming ester with carboxylic acids and producing polyesters by transesterification.

Further, the aromatic hydroxy carboxylic acids, aromatic dicarboxylic acids, and aromatic diols may be substituted with a halogen atom, a methyl group, an ethyl group, an aryl group and the like to the extent that these substituent groups do not interfere with the ester formability.

Repeating units for the liquid crystalline polyester may be exemplified as follows, however it is not limited to the following examples.

Repeating units derived from aromatic hydroxycarboxylic acids:

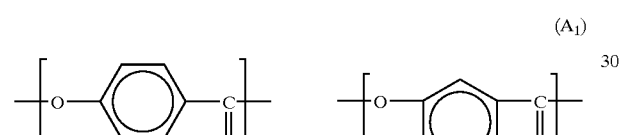

(A₁)

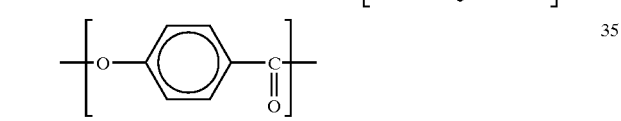

(A₂)

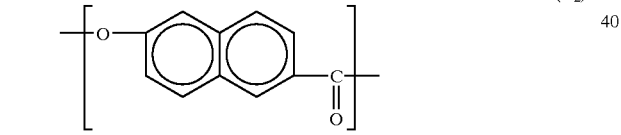

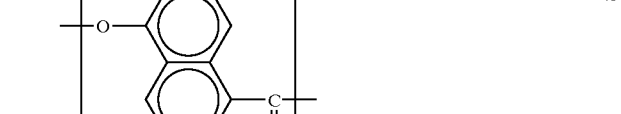

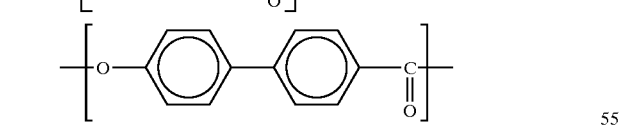

The above-exemplified repeating units may have a halogen atom or an alkyl group as a substituent.

Repeating units derived from aromatic dicarboxylic acids:

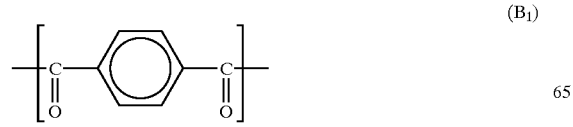

(B₁)

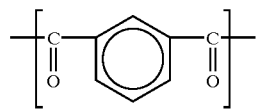

(B₂)

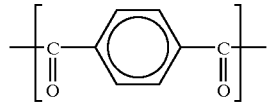

(B₃)

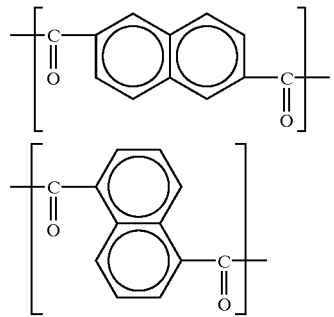

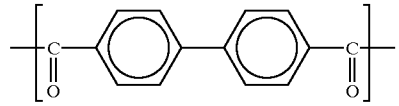

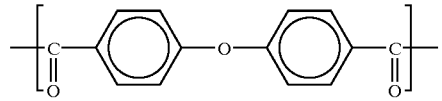

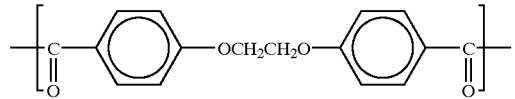

The above-exemplified repeating units may have a halogen atom, an alkyl group or an aryl group as a substituent.

Repeating units derived from aromatic diols:

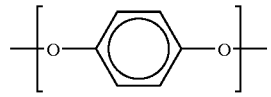

(C₁)

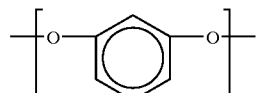

(C₂)

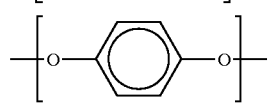

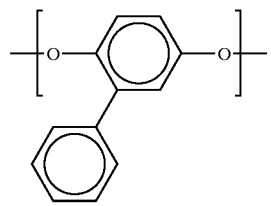

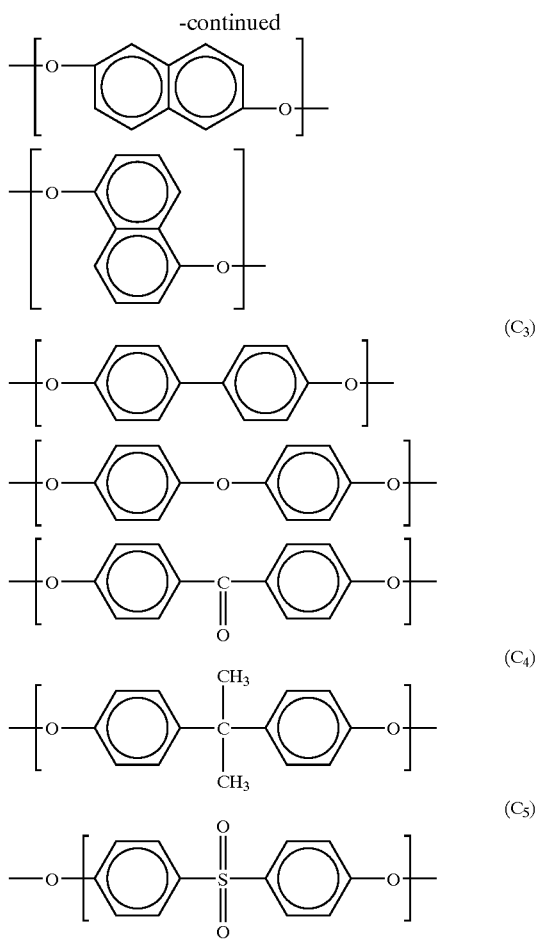

(C₃)

(C₄)

(C₅)

The above-exemplified repeating units may have a halogen atom, an alkyl group, or an aryl group as a substituent.

Among the above substituents, the alkyl group having 1 to 10 carbons is preferable, and the aryl group having 6 to 20 carbons is preferable.

From the viewpoint of the balance of heat resistance and mechanical properties, the aromatic liquid crystalline polyester is preferable to contain at least 30% by mole of the repeating unit defined as (A₁).

Preferable combinations of the repeating units are the following examples (a) to (f).

(a): a combination of (A₁), (B₁) and (C₁), or a combination of (A₁), a mixture of (B₁) and (B₂), and (C₁), (b): a combination of (A₁) and (A₂), (c): the same combination as (a) expect partly replacing (A₁) with (A₂), (d): the same combination as (a) expect partly replacing (B₁) with (B₃), (e): the same combination as (a) expect partly replacing (C₁) with (C₃), and (f): the combination of (A₁), (A₂), (B₁) and (C₂).

From the view point of appearance of the liquid crystalline property, the liquid crystalline polyester to be used in the present invention preferably comprises 30 to 80% by mole of repeating units derived from p-hydroxybenzoic acid, 10 to 35% by mole of repeating units derived from at least one selected from the group consisting of hydroquinone, resorcinol, 4,4'-dihydroxybiphenyl, bisphenol A and bisphenol S, and 10 to 35% by mole of repeating units derived from at least one selected from the group consisting of terephthalic acid, isophthalic acid and naphthalene dicarboxylic acid.

Also from the view point of heat resistance, the liquid crystalline polyester to be used in the present invention preferably comprises 30 to 80% by mole of repeating units derived from p-hydroxybenzoic acid, 10 to 35% by mole of repeating units derived from at least one kind of compound selected from the group consisting of hydroquinone and 4,4'-dihydroxybiphenyl, and 10 to 35% by mole of repeating units derived from at least one kind of compound selected from the group consisting of terephthalic acid and isophthalic acid.

From the view point of the balance of heat resistance and impact strength, the liquid crystalline polyester to be used in the present invention preferably includes at least 30% by mole of the following repeating unit:

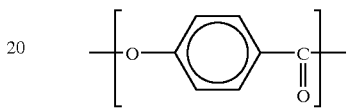

Furthermore, the weight average molecular weight of the liquid crystalline polyester is preferably 10,000 to 50,000.

A method for producing the liquid crystalline polyester to be used in the present invention is not particularly limited. For example, in the case of using aromatic hydroxycarboxylic acids, aromatic diols and aromatic dicarboxylic acids as raw materials, there is known a melt polymerization method wherein phenolic hydroxyl groups of the aromatic hydroxyl carboxylic acids and the aromatic diols are acylated with an excessive amount of acid anhydride with respect to the phenolic hydroxyl groups to obtain acylated products, and the acylated products thus obtained are subjected to transesterification (polycondensation) with carboxylic groups of the aromatic hydroxycarboxylic acids or the aromatic dicarboxylic acids. As the acylated products, fatty acid esters which are preliminarily acylated may be used.

As the aromatic diols, 4,4'-dihydroxybiphenyl is preferred, and it is more preferable to use 50 to 100% by mole of 4,4'-dihydroxybiphenyl and 0 to 50% by mole of other aromatic diols with respect to the total of 100% by mole of 4,4'-dihydroxybiphenyl and other aromatic diols.

Further, as the aromatic dicarboxylic acids, terephthalic acid is preferable, and it is more preferable to use 50 to 100% by mole of terephthalic acid and 0 to 50% by mole of other aromatic dicarboxylic acids with respect to the total of 100% by mole of terephthalic acid and other dicarboxylic acids.

In the acylation reaction, fatty acid anhydride is preferably 1.0 to 1.2 equivalents, more preferably 1.05 to 1.1 equivalents of phenolic hydroxyl group. If the adding amount of fatty acid anhydride is less than 1.0 equivalents of the phenolic hydroxyl group, the equilibrium of acylation shifts to the fatty acid anhydride, causing sublimation of the raw materials during transesterification (polycondensation) and clogging of the piping of such as reaction vessel, with the result that the reaction speed will decrease and sometimes the reaction will no longer advance. If the adding amount of fatty acid anhydride is more than 1.2 equivalents, coloring of resultant liquid crystalline polyester may be more significant.

The acylation reaction is performed preferably at 130 to 180° C. for 5 minutes to 10 hours, and more preferably at 140 to 160° C. for 10 minutes to 3 hours.

The fatty acid anhydride to be used in the acylation reaction is not particularly limited, and examples may include acetic anhydride, propionic anhydride, butyric anhydride, isobutyric anhydride, valeric anhydride, pivalic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, β-bromopropionic anhydride and the like. Two or more kinds of these anhydrides may be mixed for use. From the view points of cost and handling convenience, acetic anhydride, propionic anhydride, butyric anhydride, isobutyric anhydride are preferable, and acetic anhydride is more preferable.

In the transesterification, it is preferred that phenolic hydroxyl group is 0.8 to 1.2 equivalents of carboxylic groups.

The transesterification is performed preferably at 130 to 400° C. while raising the temperature at a rate of 0.1 to 50° C./min., and more preferably at 150 to 350° C. while raising the temperature at a rate of 0.3 to 5° C./min.

In the transesterification between a fatty acid ester obtained by acylation and a carboxylic acid, it is preferred that a fatty acid generated as a by-product and unreacted fatty acid anhydride are distilled off by means of a usual method such as distillation for the purpose of shifting the equilibrium.

In addition, for the acylation and the transesterification, catalysts may be used. As the catalysts, those known as catalysts for polymerization of polyester can be used, and examples of which include metal salt catalysts such as magnesium acetate, tin (I) acetate, tetrabutyl titanate, lead acetate, sodium acetate, potassium acetate and antimony trioxide, and organic compound catalysts such as N,N-dimethylaminopyridine and N-methylimidazole. These catalysts are usually charged at the time of charging monomers, and are not necessarily removed after acylation, and when the catalysts are not removed, they can be used for transesterification.

Although polycondensation based on transesterification is usually performed by melt polymerization, melt polymerization and solid phase polymerization may be employed together. The solid phase polymerization is preferably conducted by a known solid phase polymerization method with respect to the polymer that is produced from the melt polymerization process and then made into powder or flake form by milling. A method involving heat treatment in the solid state at 20 to 350° C. for 1 to 30 hour(s) in an inert atmosphere such as nitrogen gas is employed, for example. The solid phase polymerization may be conducted under stirring or in a still standing condition without stirring. By providing an appropriate stirring mechanism, the melt polymerization bath and the solid phase polymerization bath can be implemented by the same reaction bath. Following the solid phase polymerization, the obtained liquid crystalline polyester may be pelletized and molded by means of usually known methods.

Production of the liquid crystalline polyester can be conducted by using, for example, a batch apparatus, a continuous apparatus and the like.

To the liquid crystalline polyester obtained by above mentioned method is blended a phosphite compounds defined by the formula (I):

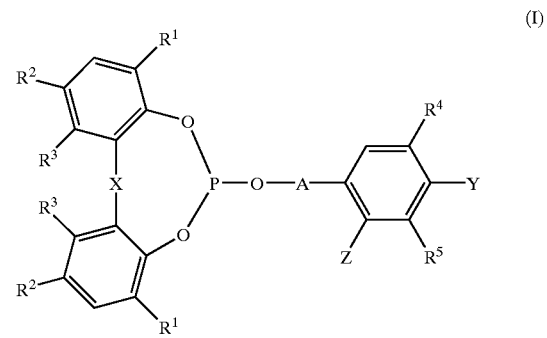

[wherein each of $R^1$, $R^2$, $R^4$ and $R^5$ represents independently a hydrogen atom, an alkyl group having 1 to 8 carbon(s), a cycloalkyl group having 5 to 8 carbons, an alkylcycloalkyl group having 6 to 12 carbons, an aralkyl group having 7 to 12 carbons or a phenyl group, $R^3$ represents a hydrogen atom or an alkyl group having 1 to 8 carbon(s), X represents a direct bond, a sulfur atom or a bivalent group defined by the general formula (I-1)

(wherein, $R^6$ represents a hydrogen atom, an alkyl group having 1 to 8 carbon(s) or a cycloalkyl group having 5 to 8 carbons), A represents an alkylene group having 2 to 8 carbons or a bivalent group defined by the general formula (I-2)

(wherein, $R^7$ represents a direct bond or an alkylene group having 1 to 8 carbon(s), * represents that this group is bonded with the oxygen atom side), either one of Y and Z represents a hydroxyl group, an alkyl group having 1 to 8 carbon(s), an alkoxyl group having 1 to 8 carbon(s) or an aralkyloxy group having 7 to 12 carbons, and the other one of Y and Z represents a hydrogen atom or an alkyl group having 1 to 8 carbon(s).]

The method for blending is not particularly limited, and usually known methods can be used.

In the phosphite compounds defined by the formula (I), each of $R^1$, $R^2$, $R^4$ and $R^5$ represents independently a hydrogen atom, an alkyl group having 1 to 8 carbon(s), a cycloalkyl group having 5 to 8 carbons, an alkylcycloalkyl group having 6 to 12 carbons, an aralkyl group having 7 to 12 carbons or a phenyl group, and examples of the alkyl group having 1 to 8 carbon(s) include a methyl group, ethyl group, n-propyl group, isopropyl group, n-butyl group, isobutyl group, sec-butyl group, tert-butyl group, tert-pentyl group, isooctyl group, tert-octyl group and 2-ethylhexyl group.

Examples of the cycloalkyl group having 5 to 8 carbons include a cyclopentyl group, cyclohexyl group, cycloheptyl group and cyclooctyl group.

Examples of the alkylcycloalkyl group having 6 to 12 carbons include a 1-methylcyclopentyl group, 1-methylcyclohexyl group and 1-methyl-4-i-propylcyclohexyl group.

Examples of the aralkyl group having 7 to 12 carbons include a benzyl group, α-methylbenzyl group and α,α-dimethylbenzyl group.

Preferably, $R^1$, $R^2$, $R^4$ are an alkyl group having 1 to 8 carbon(s), a cycloalkyl group having 5 to 8 carbons and an alkylcycloalkyl group having 6 to 12 carbons. More preferably, $R^1$, $R^4$ are a tert-alkyl group such as a tert-butyl group, a tert-pentyl group and a tert-octyl group, a cyclohexyl group, a 1-methylcyclohexyl group and the like.

$R^2$ is preferably an alkyl group having 1 to 5 carbon(s) such as an ethyl group, an n-propyl group, an isopropyl group, an n-butyl group, an isobutyl group, a sec-butyl group and a tert-pentyl group, a methyl group, a tert-butyl group, a tert-pentyl group and the like are more preferred.

$R^5$ is preferably a hydrogen atom or an alkyl group having 1 to 5 carbon(s) such as a methyl group, an ethyl group, an n-propyl group, an isopropyl group, an n-butyl group, an isobutyl group, a sec-butyl group, a tert-butyl group and a tert-pentyl group, a hydrogen atom and methyl group are more preferred.

$R^3$ represents a hydrogen atom or an alkyl group having 1 to 8 carbon(s), and examples of the alkyl group having 1 to 8 carbon(s) are as same as those recited above.

X represents a direct bond, a sulfur atom or a bivalent group defined by the formula (I-1). In the bivalent group defined by the formula (I-1), $R^6$ represents a hydrogen atom, an alkyl group having 1 to 8 carbon(s) or a cycloalkyl group having 5 to 8 carbons, and examples of the alkyl group having 1 to 8 carbon(s) and the cycloalkyl group having 5 to 8 carbons are as same as those recited above. $R^6$ is preferably a hydrogen atom or an alkyl group having 1 to 5 carbon(s) such as a methyl group, an ethyl group, an n-propyl group, an isopropyl group, an n-butyl group and an isobutyl group. X is preferably a direct bond or a bivalent group defined by the formula (I-1), a direct bond is more preferred.

A represents an alkylene group having 2 to 8 carbons or a bivalent group defined by the formula (I-2), and an alkylene group having 2 to 8 carbons is preferred. Examples of the alkylene group having 2 to 8 carbons include an ethylene group, a propylene group, a butylene group, a pentamethylene group, a hexamethylene group, an octamethylene group and a 2,2-dimethyl-1,3-propylene group, and a propylene group is preferred. A bivalent group defined by the formula (I-2) is bonded to an oxygen atom and a benzene ring, while bonded to an oxygen atom at *. $R^7$ represents a direct bond or an alkylene group having 1 to 8 carbon(s). Examples of the alkylene group having 1 to 8 carbon(s) include a metylene group, an ethylene group, a propylene group, a butylene group, a pentamethylene group, a hexamethylene group, an octamethylene group and a 2,2-dimethyl-1,3-propylene group. $R^7$ is preferably a direct bond or an ethylene group.

Either one of Y and Z represents a hydroxyl group, an alkyl group having 1 to 8 carbon(s), an alkoxyl group having 1 to 8 carbon(s) or an aralkyloxy group having 7 to 12 carbons, and the other one of Y and Z represents a hydrogen atom or an alkyl group having 1 to 8 carbon(s). In connection with this, examples of the alkyl group having 1 to 8 carbon(s) are as same as those recited above. Examples of the alkoxyl group having 1 to 8 carbon(s) include a methoxy group, an ethoxy group, an n-propoxy group, an isopropoxy group, an n-butoxy group, an isobutoxy group, a sec-butoxy group, a tert-butoxy group, a tert-pentoxy group, an isooctoxy group, a tertoctoxy group and a 2-ethylhexoxy group.

Examples of the aralkyloxy group having 7 to 12 carbons include a benzyloxy group, an α-methylbenzyloxy group and an α,α-dimethylbenzyloxy group. Y and Z may be such that Y is a hydroxyl group, an alkyl group having 1 to 8 carbon(s), an alkoxyl group having 1 to 8 carbon(s) or an aralkyloxy group having 7 to 12 carbons, while Z is a hydrogen atom or an alkyl group having 1 to 8 carbon(s). Alternatively, Y and Z may be such that Z is a hydroxyl group, an alkyl group having 1 to 8 carbon(s), an alkoxyl group having 1 to 8 carbon(s) or an aralkyloxy group having 7 to 12 carbons, while Y is a hydrogen atom or an alkyl group having 1 to 8 carbon(s).

Among the phosphite compounds defined by the formula (I), compounds wherein $R^1$ and $R^4$ are a tert-alkyl group, a cyclohexyl group or a 1-methylcyclohexyl group, $R^2$ is an alkyl group having 1 to 5 carbon(s), $R^5$ is a hydrogen atom or an alkyl group having 1 to 5 carbon(s), $R^3$ is a hydrogen atom or an alkyl group having 1 to 5 carbon(s), X is a direct bond and A is an alkylene group having 2 to 8 carbons are especially preferred.

Examples of the phosphite compounds defined by the formula (I) include 2,4,8,10-tetra-t-butyl-6-[3-(3-methyl-4-hydroxy-5-t-butylphenyl)propoxy]dibenzo[d,f][1,3,2]dioxaphosphepin [available from Sumitomo Chemical Co., Ltd. in the trade name of "SUMILIZER-GP"];

2,10-dimetyl-4,8-di-t-butyl-6-[3-(3,5-di-t-butyl-4-hydroxyphenyl)propoxy]-12H-dimenzo[d,g][1,3,2]dioxaphosphosin;

2,4,8,10-tetra-t-butyl-6-[3-(3,5-di-t-butyl-4-hydroxyphenyl)propoxy]dibenzo[d,f][1,3,2]dioxaphosphepin;

2,4,8,10-tetra-t-pentyl-6-[3-(3,5-di-t-butyl-4-hydroxyphenyl)propoxy]-12-methyl-12H-dibenzo[d,g][1,3,2]dioxaphosphosin;

2,10-dimethyl-4,8-di-t-butyl-6-[3-(3,5-di-t-butyl-4-hydroxyphenyl)propionyloxy]-12H-dibenzo [d,g][1,3,2]dioxaphosphosin;

2,4,8,10-tetra-t-pentyl-6-[3-(3,5-di-t-butyl-4-hydroxyphenyl)propionyloxy]-12-methyl-12H-dibenzo [d,g][1,3,2]dioxaphosphosin;

2,4,8,10-tetra-t-butyl-6-[3-(3,5-di-t-butyl-4-hydroxyphenyl)propionyloxy]-dibenzo[d,f][1,3,2]dioxaphosphepin;

2,10-dimethyl-4,8-di-t-butyl-6-(3,5-di-t-butyl-4-hydroxybenzoyloxy)-12H-dibenzo[d,g][1,3,2]dioxaphosphosin;

2,4,8,10-tetra-t-butyl-6-(3,5-di-t-butyl-4-hydroxybenzoyloxy)-12-methyl-12H-dibenzo[d,g][1,3,2]dioxaphosphosin;

2,10-dimethyl-4,8-di-t-butyl-6-[3-(3-methyl-4-hydroxy-5-t-butylphenyl)propoxyl]-12H-dibenzo [d,g][1,3,2]dioxaphosphosin;

2,4,8,10-tetra-t-butyl-6-[3-(3,5-di-t-butyl-4-hydroxyphenyl)propoxy]-12H-dibenzo[d,g][1,3,2]dioxaphosphosin;

2,10-diethyl-4,8-di-t-butyl-6-[3-(3,5-di-t-butyl-4-hydroxyphenyl)propoxy]-12H-dibenzo[d,g][1,3,2]dioxaphosphosin; and 2,4,8,10-tetra-t-butyl-6-[2,2-dimethyl-3-(3-t-butyl-4-hydroxy-5-methylphenyl)propoxy]-dibenzo[d,f][1,3,2]dioxaphosphepin.

The phosphite compounds defined by the general formula (I) can be produced, for example, by a method disclosed in Japanese Unexamined Patent Publication No. 9-149270 (1997).

The amount of the phosphite compounds is not less than 0.01 parts by weight and less than 0.2 parts by weight, preferably from 0.1 to 0.15 parts by weight based on 100 parts by weight of the liquid crystalline polyester.

By blending at least one kind of phosphite compounds in the amount of not less than 0.01 part by weight and less than 0.2 part by weight, the thermal stability of the obtainable liquid crystalline polyester resin composition and molded products obtained from such composition is significantly improved.

If the blending amount of the phosphite compounds is less than 0.01 part by weight, sufficient effect may not be achieved in the thermal stability, whereas if it is no less than 0.2 part by weight, a blister may occur in a molded product in the course of soldering.

A method for blending is not particularly limited, and such a method can be recited that after a liquid crystalline polyester and phosphite compounds are mixed using a Henshel mixer, tumbler or the like, melt kneading is carried out using an extruder.

For the purpose of improving the mechanical strength, inorganic or organic fillers in the fibrous, particulate, sheet or the like form may be blended in the liquid crystalline polyester resin composition according to the present invention, and even in the case where such fillers are blended, a filler-containing liquid crystalline polyester resin composition having excellent thermal stability can be obtained by adding the phosphite compounds defined by the formula (I) to the liquid crystalline polyester resin containing fillers. Examples of fibrous filler include a glass fiber, asbestos fiber, silica fiber, silica alumina fiber, potassium titanate fiber, carbon or graphite fiber, fibrous substances of metal such as aluminum, titanium and copper, and among them a glass fiber is preferred.

Examples of particulate filer include silicates such as calcium silicate, aluminum silicate, talc, clay, diatom earth, wollastonite, a variety of metal powder such as iron oxide, titanium oxide, zinc oxide, antimony trioxide, alumina and calcium sulfate, carbon black, graphite, silica, quarts sand, glass bead, milled glass fiber, glass balloon and glass powder.

Examples of sheet filler include mica, glass flake and various kinds of metallic foil.

Other organic fillers include, for example, heat resistant high strength fibers made of aromatic polyesters, aromatic polyimide, polyamides and the like.

These fillers may be surface-treated with conventionally known surface preparation agents as is necessary. In the cases of using fibrous fillers, binders and the like may be used.

When fillers are blended, the blending amount is preferably from 10% by weight to 80% by weight, more preferably from 10% by weight to 70% by weight with respect to the entire composition. If more than 80% by weight of fillers are blended, mechanical strength may decrease. A method for blending fillers is not particularly limited, and methods conventionally known in the art can be exemplified.

Furthermore, in addition to the aforementioned agents, a variety of additives such as antioxidants, reinforcers, pigments, fortifiers, heat stabilizers conventionally known may be added to the liquid crystalline polyester resin composition according to the present invention.

Two or more kinds of the above-mentioned fillers and the additives may be used.

Furthermore, one or more kind(s) of polypropylene, polyamide, polyester, polyphenylene sulfide, polyether ketone, polycarbonate, polyether sulfone, polyphenylether and modified substances thereof, thermoplastic resins such as polyetherimide, thermosetting resins such as phenol resin, epoxy resin, polyimide resin and cyanate resin may be added to the liquid crystalline polyester resin composition according to the present invention without departing from the object of the present invention.

The liquid crystalline polyester resin composition according to the present invention can be worked into molded products such as fibers, films, 3-D molded products, containers, hoses, by being subjected to a melt molding method that is conventionally known in the art, for example, extrusion molding, injection molding, compression molding and blow molding.

The molded products thus obtained can be subjected to heat treatment to improve the strength and elasticity.

The heat treatment can be carried out by heating molded products at a temperature which is not more than the melting point of the polymer in an inert atmosphere (for example, nitrogen, argon, helium and the like), in an oxygen-containing atmosphere (for example, air) or under a reduced pressure.

EXAMPLES

Hereinafter, the invention will be described with the reference to examples, however the present invention is not limited to these examples.

Characteristics of each liquid crystalline polyester resin obtained by examples and comparative examples are evaluated in the following manners.

Properties of Resin (1) Solder Resistance (Blister Occurrence when Immersed in Solder)

JIS K71131 (1/2) dumbbell×1.2 mmt was immersed for 5 minutes in H60A solder (tin 60%, lead 40%) at 300° C., and the number of molded products in which foaming (blister) was observed among 10 molded products was determined.

(2) Stability of Melt Viscosity (Index for Thermal Stability)

Change in melt viscosity per time was measured in the condition as described below with the use of a control stress rheometer CVO manufactured by Bohlin Instruments Co., Ltd. The smaller the change in melt viscosity per time at each temperature, the more excellent in the thermal stability.

Temperature: 360° C., 380° C.

Atmosphere: Nitrogen 200 ml/min

Measurement time: 1 hour

Geometry: Complete 5.4°/25ϕ

Frequency for measurement: 1 Hz

Pre-Shear: OFF

Target Strain: 0.01

Mode: Auto

Example 1

A reaction vessel equipped with a stirrer, torque meter, nitrogen gas tube, thermometer and reflux condenser was charged with 911 g (6.6 mol) of p-hydroxybenzoic acid, 409 g (2.2 mol) of 4.4'-dihydroxybiphenyl, 274 g (1.65 mol) of terephthalic acid, 91 g (0.55 mol) of isophthalic acid and 1235 g (12.1 mol) of acetic anhydride. Following sufficient replacement of inside the reaction vessel with nitrogen gas, the temperature was raised to 150° C. over 15 minutes under the nitrogen gas flow, and refluxed for 3 hours while keeping that temperature.

Thereafter, the temperature of the reaction was raised to 320° C. over 2 hours and 50 minutes while distilling off the effluent acetic acids which is a by-product and unreacted acetic anhydride, and the content was removed out by regarding the point of time when a rise in torque is observed as an end of the reaction. The obtained solid was cooled to the room temperature, and milled with a coarse grinder, and then the temperature was raised from the room temperature to 250° C. over 1 hour under the nitrogen atmosphere, followed by temperature raising from 250° C. to 288° C. over 5 hours and 3 hour retaining at 288° C., thereby allowing polymerization reaction in the solid state. As a result of observation using a polarizing microscope, the obtained resin showed an optical anisotropy at the time of melting (350° C.).

After blending 0.05 part by weight of a phosphite compound (SUMILIZER-GP available from Sumitomo Chemical Co., Ltd., defined by the formula (II) below) with respect to 100 parts by weight of the obtained resin, milled glass (EFH-7501) available from Central Glass Co., Ltd. was blended so that it occupies 40% by weight of the whole, followed by mixing and granulation at 340° C. using a biaxial extruder (PCM-30 model manufactured by Ikegai Ironworker Co., Ltd.). The obtained pellet was then subjected to injection molding at a cylinder temperature of 350° C. and at a mold temperature of 130° C., using an injection molding machine manufactured by Nissei Plastic Industrial Co., Ltd., and properties (solder resistance and stability of melt viscosity) of the resin were evaluated. The results are shown in Table 1.

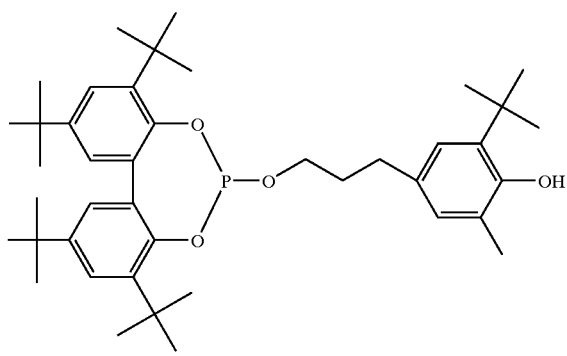

(II)

Comparative Example 1

Properties (solder resistance and stability of melt viscosity) of the resin were evaluated in the same manner as in example 1 except that the phophite compound was not used. The results are shown in Table 1.

Comparative Example 2

Properties (solder resistance and stability of melt viscosity) of the resin were evaluated in the same manner as in example 1 except that 0.2 parts by weight of the phophite compound (SUMILIZER-GP available from Sumitomo Chemical Co., Ltd., defined by the formula (II)) was used. The results are shown in Table 1.

Comparative Example 3

Properties (solder resistance and stability of melt viscosity) of the resin were evaluated in the same manner as in example 1 except that 0.05 part by weight of ADE-KASTAB PEP-8 (defined by the formula (III) below) manufactured by ASAHI DENKA Co., Ltd. was used as a phosphite compound. The results are shown in Table 1.

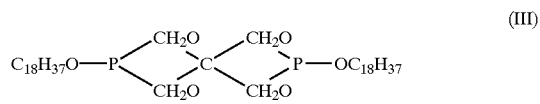

(III)

Comparative Example 4

Properties (solder resistance and stability of melt viscosity) of the resin were evaluated in the same manner as in example 1 except that 0.05 part by weight of ADE-KASTAB PEP-36 (defined by the formula (IV) below) manufactured by ASAHI DENKA Co., Ltd. was used as a phosphite compound. The results are shown in Table 1.

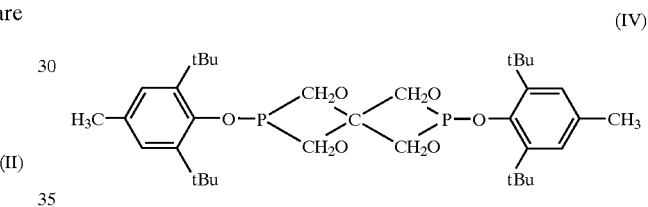

(IV)

Comparative Example 5

A property (solder resistance) of the resin was evaluated in the same manner as in example 1 except that 0.05 part by weight of 2,2'-methylenebis(4,6-di-t-butylphenyl) octylphosphite (defined by the formula (V) below) was used as a phosphite compound. The results are shown in Table 1.

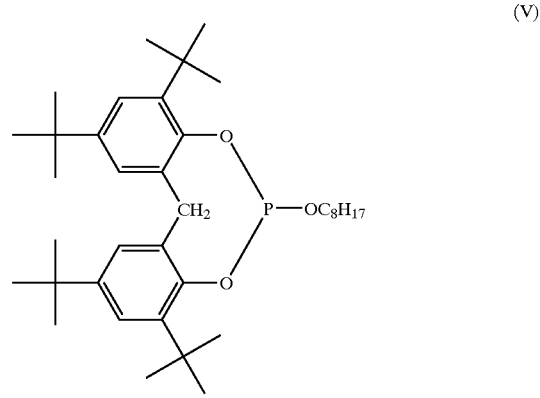

(V)

TABLE 1

|  | Example 1 | Comparative Example 1 | Comparative Example 2 | Comparative Example 3 | Comparative Example 4 | Comparative Example 5 |
|---|---|---|---|---|---|---|
| Phosphite compound | (II) 0.05 part by weight |  | (II) 0.2 part by weight | (III) 0.05 part by weight | (IV) 0.05 part by weight | (V) 0.05 part by weight |
| Solder resistance | ○ | ○ | X | Δ | X | X |
| Melt viscosity (Pa) |  |  |  |  |  | — |
| 1 min. | 270 | 480 | 140 | 100 | 70 | — |
| 10 min. | 1400 | 3100 | 220 | 950 | 150 | — |
| 30 min. | 8400 | 17100 | 2980 | 9100 | 1900 | — |
| 60 min. | 26000 | 37000 | 24000 | 31000 | 11000 | — |

*) number of dumbbells wherein foaming was observed
0: ○
1–5: Δ
6–10: X

According to the present invention, it becomes possible to provide a liquid crystalline polyester resin composition capable of producing molded products having excellent thermal stability under high temperatures without causing occurrence of blister in the molded products even in the course of soldering.

What is claimed is:

1. A liquid crystalline polyester resin composition comprising 100 parts by weight of a liquid crystalline polyester forming an anisotropic melt phase, and
   not less than 0.01 part by weight and less than 0.2 part by weight of at least one of phosphite compounds defined by the following formula (I):

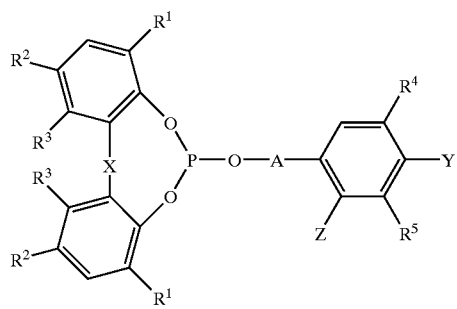

(I)

(wherein each of $R^1$, $R^2$, $R^4$ and $R^5$ represents independently a hydrogen atom, an alkyl group having 1 to 8 carbon(s), a cycloalkyl group having 5 to 8 carbons, an alkylcycloalkyl group having 6 to 12 carbons, an aralkyl group having 7 to 12 carbons or a phenyl group, $R^3$ represents a hydrogen atom or an alkyl group having 1 to 8 carbon(s), X represents a direct bond, a sulfur atom or a bivalent group defined by the general formula (I-1)

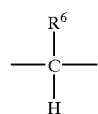

(I-1)

(wherein, $R^6$ represents a hydrogen atom, an alkyl group having 1 to 8 carbon(s) or a cycloalkyl group having 5 to 8 carbons), A represents an alkylene group having 2 to 8 carbons or a bivalent group defined by the general formula (I-2)

(I-2)

(wherein, $R^7$ represents a direct bond or an alkylene group having 1 to 8 carbon(s), * represents that this group is bonded with the oxygen atom on this side), either one of Y and Z represents a hydroxyl group, an alkyl group having 1 to 8 carbon(s), an alkoxyl group having 1 to 8 carbon(s) or an aralkyloxy group having 7 to 12 carbons, and the other one of Y and Z represents a hydrogen atom or an alkyl group having 1 to 8 carbon(s)).

2. The liquid crystalline polyester resin composition according to claim 1, wherein the liquid crystalline polyester forming the anisotropic melt phase is a liquid crystalline polyester comprising a repeating unit derived from aromatic hydroxycarboxylic acids, a repeating unit derived from aromatic diols and a repeating unit derived from dicarboxylic acids.

3. The liquid crystalline polyester resin composition according to claim 2, wherein the repeating unit derived from aromatic hydroxycarboxylic acids is a repeating unit derived from p-hydroxy benzoic acid, the repeating unit derived from aromatic diols is a repeating unit derived from at least one selected from the group consisting of hydroquinone, resorcinol, 4,4'-dihydroxybiphenyl, bisphenol A and bisphenol S, and the repeating unit derived from dicarboxylic acids is a repeating unit derived from at least one selected from the group consisting of terephthalic acid, isophthalic acid and naphthalene dicarboxylic acid.

4. The liquid crystalline polyester resin composition according to claim 3, wherein the amount of the repeating unit derived from p-hydroxybenzoic acid is 30 to 80% by mole in the liquid crystalline polyester resin, the amount of the repeating unit derived from at least one kind selected from the group consisting of hydroquinone, resorcinol, 4,4'-dihydroxyhiphenyl, bisphenol A and bisphenol S is 10 to 35% by mole in the liquid crystalline polyester resin, and the amount of the repeating unit derived from at least one kind selected from the group consisting of terephthalic acid, isophthalic acid and naphthalene dicarboxylic acid is 10 to 35% by mole in the liquid crystalline polyester resin.

5. The liquid crystalline polyester resin composition according to claim 1, wherein the amount of the phosphite compounds derived by the formula (I) is from 0.1 parts by weight to 0.15 parts by weight.

6. The liquid crystalline polyester resin composition according to claim 2, wherein the liquid crystalline polyester forming the anisotropic melt phase is a liquid crystalline polyester obtained by acylating hydroxy groups of aromatic hydroxycarboxylic acids and aromatic diols in the presence of an excessive amount of fatty acid anhydride with respect to the hydroxy groups and carrying transesterification between the acylated compounds and carboxylic acids.

7. The liquid crystalline polyester resin composition according to claim 6, wherein the aromatic hydroxycarboxylic acids is p-hydroxybenzoic acid, the aromatic dicarboxylic acids comprise 50 to 100% by mole of terephthalic acid and 0 to 50% by mole of other aromatic dicarboxylic acids (provided that the sum of the aromatic dicarboxylic acids is 100% by mole), and the aromatic diols comprise 50 to 100% by mole of 4,4'-dihydroxybiphenyl and 0 to 50% by mole of other aromatic diols (provided that the sum of the aromatic diols is 100% by mole).

8. The liquid crystalline polyester resin composition according to claim 1, wherein further containing a filler.

9. The liquid crystalline polyester resin composition according to claim 8, wherein the filler is glass fiber.

10. The liquid crystalline polyester resin composition according to claim 8, wherein the amount of the filler is from 10% by weight to 80% by weight of the total amount of the liquid crystalline polyester, the phosphite compounds defined by the formula (I) and the filler.

11. A molded product formed of the liquid crystalline polyester resin composition according to claim 1 or 8.

12. A method for improvement in thermal stability of a liquid crystalline polyester resin composition comprising adding not less than 0.01 part by weight and less than 0.2 part by weight of at least one kind of phosphite compounds defined by the formula (I) to 100 parts by weight of a liquid crystalline polyester forming an anisotropic melt phase and obtaining the the liquid crystalline polyester resin composition wherein formula (I) is:

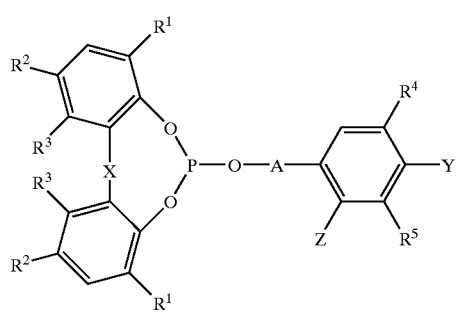

(I)

(wherein each of $R^1$, $R^2$, $R^4$ and $R^5$ represents independently a hydrogen atom, an alkyl group having 1 to 8 carbon(s), a cycloalkyl group having 5 to 8 carbons, an alkylcyoloalkyl group having 6 to 12 carbons, an aralkyl group having 7 to 12 carbons or a phenyl group; $R^3$ represents a hydrogen atom or an alkyl group having 1 to 8 carbon(s); X represents a direct bond, a sulfur atom or a bivalent group defined by the general formula (I-1)

(I-1)

(wherein, $R^6$ represents a hydrogen atom, an alkyl group having 1 to 8 carbon(s) or a cycloalkyl group having 5 to 8 carbons), A represents an alkylene group having 2 to 8 carbons or a bivalent group defined by the general formula (I-2)

(I-2)

(wherein, $R^7$ represents a direct bond or an alkylene group having 1 to 8 carbon(s), * represents that this group is bonded with the oxygen atom on this side), either one of Y and Z represents a hydroxyl group, an alkyl group having 1 to 8 carbon(s), an alkoxyl group having 1 to 8 carbon(s) or an aralkyloxy group having 7 to 12 carbons, and the other one of Y and Z represents a hydrogen atom or an alkyl group having 1 to 8 carbon (s)).

13. The method according to claim 12, wherein the liquid crystalline polyester forming the anisotropic melt phase is a liquid crystalline polyester obtained by acylating monomer hydroxy of aromatic hydroxycarboxylic acids, aromatic diols and dicarboxylic acids by an excessive amount of fatty acid anhydride and conducting transesterification between the acylated compounds and carboxylic acids of reaction system.

14. The method according to claim 13, wherein the aromatic hydroxycarboxylic acids is p-hydroxybenzoic acid, the aromatic dicarboxylic acids comprise 50 to 100% by mole of terephthalic acid and 0 to 50% by mole of other aromatic dicarboxylic acids (provided that the sum of the aromatic dicarboxylic acids is 100% by mole), and the aromatic diols comprise 50 to 100% by mole of 4,4'-dihydroxybiphenyl and 0 to 50% by mole of other aromatic diols (provided that the sum of the aromatic diols is 100% by mole).

* * * * *